(12) United States Patent  
Keen

(10) Patent No.: US 11,858,318 B2  
(45) Date of Patent: Jan. 2, 2024

(54) VEHICULAR POWER SHADE CONTROL SYSTEM AND METHOD

(71) Applicant: GM GLOBAL TECHNOLOGY OPERATIONS LLC, Detroit, MI (US)

(72) Inventor: Elliott D. Keen, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 435 days.

(21) Appl. No.: 17/196,320

(22) Filed: Mar. 9, 2021

(65) Prior Publication Data

US 2022/0289002 A1  Sep. 15, 2022

(51) Int. Cl.
B60J 1/20 (2006.01)

(52) U.S. Cl.
CPC .......... B60J 1/2016 (2013.01); B60J 1/2019 (2013.01); B60J 1/2086 (2013.01)

(58) Field of Classification Search
CPC ...... B60J 1/2016; B60J 1/2019; B60J 1/2086; B60J 1/2011; B60J 1/2013; B60J 1/2066; B60J 1/2069; B60J 1/2075; B60J 1/2077; B60J 1/208; B60J 1/2083; B60W 60/0013
See application file for complete search history.

(56) References Cited

U.S. PATENT DOCUMENTS

| | | | |
|---|---|---|---|
| 7,216,917 B2 * | 5/2007 | Tadakamalla | B60J 1/2016 296/97.4 |
| 7,503,374 B2 * | 3/2009 | Takeuchi | B60J 1/2027 160/370.21 |
| 7,828,040 B2 * | 11/2010 | Miyachi | B60J 1/2069 160/122 |
| 7,837,249 B2 * | 11/2010 | Uematsu | B60J 1/2011 296/96.19 |
| 8,030,872 B2 * | 10/2011 | Lin | B60J 1/2016 318/446 |
| 10,059,175 B2 * | 8/2018 | Cuddihy | B60J 1/2016 |
| 11,084,497 B2 * | 8/2021 | Ibuka | B60W 60/0059 |
| 2003/0141025 A1 * | 7/2003 | Schlecht | B60J 1/208 160/370.22 |
| 2006/0082192 A1 * | 4/2006 | Dubay | B60J 7/0015 296/214 |
| 2010/0327633 A1 * | 12/2010 | Kato | E05F 15/41 296/223 |
| 2017/0136854 A1 * | 5/2017 | Dunne | B60J 1/2088 |
| 2020/0269663 A1 * | 8/2020 | Urano | G05D 1/0088 |
| 2021/0146803 A1 * | 5/2021 | Wu | B60N 2/0232 |
| 2023/0168091 A1 * | 6/2023 | Kim | B60J 1/2011 701/49 |

FOREIGN PATENT DOCUMENTS

| | | |
|---|---|---|
| DE | 10041709 A1 | 5/2002 |
| DE | 10126682 A1 | 12/2002 |
| DE | 102011016652 A1 | 10/2012 |

* cited by examiner

*Primary Examiner* — Abe Massad
(74) *Attorney, Agent, or Firm* — Quinn IP Law

(57) ABSTRACT

A system for vehicular power shade control is provided. The system includes a power shade operable to selectively deploy and retract in relation to a corresponding window of a vehicle, a sensor providing data related to the vehicle, and a computerized power shade controller. The computerized power shade controller operates programming to monitor the data from the sensor, compare the data to a threshold value, and generate a command to the power shade based upon the comparing.

20 Claims, 8 Drawing Sheets

VEHICULAR POWER SHADE CONTROL SYSTEM AND METHOD

INTRODUCTION

The disclosure generally relates to a vehicular power shade control system and method.

A vehicle may include a plurality of windows adjacent to a second and/or third row of seats. In addition, a vehicle may include a rear window located behind a last row of seats through which a driver of the vehicle may view an area behind the vehicle. Some portion of the windows of a vehicle may be tinted, for example, with a polymerized film being adhered to the glass of the windows. Such full-time tinted windows may pose issues for a driver, for example, reducing visibility through the window in low light conditions.

SUMMARY

A system for vehicular power shade control is provided. The system includes a power shade operable to selectively deploy and retract in relation to a corresponding window of a vehicle, a sensor providing data related to the vehicle, and a computerized power shade controller. The computerized power shade controller operates programming to monitor the data from the sensor, compare the data to a threshold value, and generate a command to the power shade based upon the comparing.

In some embodiments, the sensor includes a window status sensor for the corresponding window and is operable to provide the data including a window open/closed status. Comparing the data to the threshold value includes determining whether the window open/closed status indicates a window open status. The computerized power shade controller further operates programming to command the corresponding window to close. Generating the command to the power shade includes commanding the power shade to deploy after the corresponding window has closed.

In some embodiments, the computerized power shade controller further operates programming to monitor a user command to open the corresponding window. The sensor includes a power shade status sensor for the power shade and is operable to provide the data including a power shade deployed/retracted status. Comparing the data to the threshold value includes determining whether the power shade deployed/retracted status indicates a power shade deployed status. Generating the command to the power shade includes, upon monitoring the user command to open the corresponding window, commanding the power shade to retract. The computerized power shade controller further operates programming to command the corresponding window to open after the power shade has been retracted.

In some embodiments, the power shade includes a rear window shade. The sensor includes a transmission state sensor operable to provide the data including a transmission state. Comparing the data to the threshold value includes determining whether the transmission state indicates a reverse transmission setting. Generating the command to the power shade includes commanding the rear window shade to retract based upon the comparing.

In some embodiments, generating the command to the power shade further includes commanding rear quarter panel window shades and rear side window shades to retract based upon the comparing.

In some embodiments, the sensor includes an ambient light sensor operable to provide the data including an ambient light level. Comparing the data to the threshold value includes determining whether the ambient light level is above a threshold ambient light level. Generating the command to the power shade includes commanding the power shade to deploy based upon the comparing.

In some embodiments, the sensor includes a solar sensor operable to provide a sun position relative to the vehicle. The system further includes the corresponding window. Comparing the data to the threshold value includes determining whether the sun position is within threshold relative angles for the corresponding window indicating that sunlight is shining through the corresponding window. Generating the command to the power shade includes commanding the power shade to deploy based upon the comparing.

In some embodiments, the sensor includes a camera device.

In some embodiments, the camera device is operable to provide a sun position relative to the vehicle. The system further includes the corresponding window. Comparing the data to the threshold value includes determining whether the sun position is within threshold relative angles for the corresponding window indicating that sunlight is shining through the corresponding window. Generating the command to the power shade includes commanding the power shade to deploy based upon the comparing.

In some embodiments, the camera device is operable to provide a traffic density value. Comparing the data to the threshold value includes determining whether the traffic density value exceeds a threshold traffic density. Generating the command to the power shade includes commanding the power shade to deploy based upon the comparing.

In some embodiments, the system further includes a computerized navigational system operable to provide a planned navigational route. The data includes a vehicle position. Comparing the data to the threshold value includes determining whether the vehicle position is within a threshold distance of a planned lane change within the planned navigational route. Generating the command to the power shade includes commanding the power shade to retract based upon the comparing.

According to one alternative embodiment, a method for vehicular power shade control is provided. The method includes, within a computerized power shade controller of a vehicle, operating programming to monitor a sensor providing data related to the vehicle, compare the data to a threshold value, and generate a command to a power shade based upon the comparing. The power shade is operable to selectively deploy and retract in relation to a corresponding window of the vehicle.

In some embodiments, monitoring the data includes monitoring a window open/closed status for the corresponding window. Comparing the data to the threshold value includes determining whether the window open/closed status indicates a window open status. The method further includes operating programming to command the corresponding window to close. Generating the command to the power shade includes commanding the power shade to deploy after the corresponding window has closed.

In some embodiments, the method further includes operating programming to monitor a user command to open the corresponding window. Monitoring the data includes monitoring a power shade deployed/retracted status. Comparing the data to the threshold value includes determining whether the power shade deployed/retracted status indicates a power shade deployed status. Generating the command to the power shade includes, upon monitoring the user command to open the corresponding window, commanding the power shade to retract. The method further includes operating programming to command the corresponding window to open after the power shade has been retracted.

In some embodiments, monitoring the data includes monitoring a transmission state for the vehicle. Comparing the data to the threshold value includes determining whether the transmission state indicates a reverse transmission setting. Generating the command to the power shade includes commanding a rear window shade to retract based upon the comparing.

In some embodiments, monitoring the data includes monitoring an ambient light level. Comparing the data to the threshold value includes determining whether the ambient light level is above a threshold ambient light level. Generating the command to the power shade includes commanding the power shade to deploy based upon the comparing.

In some embodiments, monitoring the data includes monitoring data captured by a solar sensor operable to provide a sun position relative to the vehicle. Comparing the data to the threshold value includes determining whether the sun position is within threshold relative angles for the corresponding window indicating that sunlight is shining through the corresponding window. Generating the command to the power shade includes commanding the power shade to deploy based upon the comparing.

In some embodiments, monitoring the data includes monitoring images captured by a camera device. Monitoring the images captured by the camera device includes monitoring a traffic density value. Comparing the data to the threshold value includes determining whether the traffic density value exceeds a threshold traffic density. Generating the command to the power shade includes commanding the power shade to deploy based upon the comparing.

In some embodiments, the method further includes monitoring a planned navigational route from a computerized navigational system. Monitoring the data includes monitoring a vehicle position. Comparing the data to the threshold value includes determining whether the vehicle position is within a threshold distance of a planned lane change within the planned navigational route. Generating the command to the power shade includes commanding the power shade to retract based upon the comparing.

The above features and advantages and other features and advantages of the present disclosure are readily apparent from the following detailed description of the best modes for carrying out the disclosure when taken in connection with the accompanying drawings.

DETAILED DESCRIPTION

Figure 1:
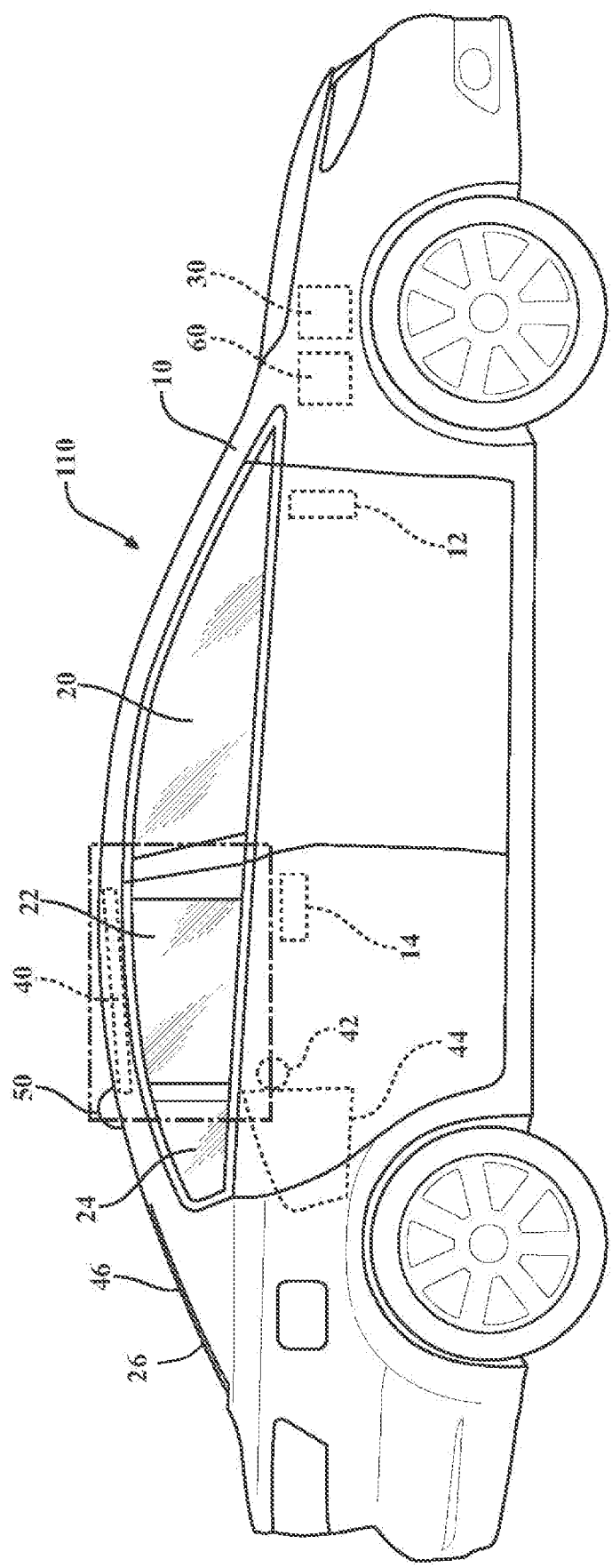
FIG. 1 schematically illustrates an exemplary vehicle including a power shade control system, in accordance with the present disclosure.

Shading of side and rear windows may be advantageous to occupants of a vehicle for additional privacy, preventing others in neighboring vehicles from seeing the occupants of the vehicle. Additionally, shading of side and rear windows may reduce an amount of solar radiation entering and warming the interior of the vehicle or may reduce sun load upon the interior of the vehicle. Such a reduction in sun load may make occupants of the vehicle more comfortable and may result in energy savings by reducing workload upon a vehicle air conditioning system.

A power shade control system is disclosed. A power window shade is a device that is capable of selectively extending a shade over a window surface and selective retracting the shade from the window surface.

A power window shade may be a shade film. A shade film may be a paper-thin, flexible, polymerized sheet that may be spooled upon a spinning axle when the polymerized sheet is retracted from the window surface. A shade film may be a film applied and adhered to a first panel of glass which may be selectively extended and retracted in addition to or in the alternative to a second panel of glass without the film. A power window shade may alternatively be translucent or opaque mechanical shade including a plurality of slats that may be selectively deployed or rotated to change an amount of light that may pass through the mechanical shade.

A control scheme or method is additionally disclosed. In one embodiment, the power window shade may be deployed when a corresponding window is closed. For example, if a side rear window is closed, a corresponding power window shade disposed upon or near the side rear window may be deployed over the side rear window and retracted as desired. If the side rear window is open and a request to deploy the power window shade is monitored, the control method may override the request to deploy the power window shade or may first command that the rear side window be closed. In one embodiment, an audio or display output may be generated explaining why a request to deploy the power window shade was overridden.

The control method may additionally or alternatively include controlling a power window shade based upon operation of the vehicle, for example, to improve visibility for a driver of the vehicle. For example, a power window shade corresponding to a back glass window of the vehicle may be controlled to be retracted if the vehicle is placed in a reverse transmission setting. A back glass window may include a rear window, a rear quarter panel window, and/or a rear side window. In another example, a power window shade corresponding to a rear side window and/or a power window shade corresponding to a rear quarter panel window may be retracted based upon an indicated desire to change lanes or a navigational route entered into a navigational system that indicates a lane change is likely or imminent. In these ways, a power window shade may be retracted to improve visibility based upon operation or likely operation of the vehicle. Further, the power window shades may be controlled based upon an orientation of the vehicle in relation to the sun. A sun position or incident angle of sunlight relative to the vehicle may be determined by a solar sensor utilized in the art. The power window shades may be deployed when the vehicle is oriented such that sunlight may shine directly into the corresponding window, and the power window shades may be retracted when the vehicle is oriented such that sunlight may not shine directly into the corresponding window. In another embodiment, the power window shades may be deployed or retracted based upon monitored data related to time of day, weather, and ambient light levels. The power window shades may be controlled based upon data collected from a camera device disposed upon the vehicle. For example, an image from the camera device may be analyzed to determine that a neighboring vehicle directly behind the vehicle has high beam headlights activated, and, based upon the analysis, commanding a power window shade corresponding to a rear window of the vehicle to deploy to avoid the high beam headlights from distracting the driver of the vehicle.

FIG. 1 schematically illustrates an exemplary vehicle 10 including a power shade control system 110. The vehicle 10 includes a front side window 20, a rear side window 22, a rear quarter panel window 24, and a rear window 26. The front side window 20 may be kept without a power shade to maintain maximum visibility for a driver of the vehicle. The power shade control system 110 includes a power shade controller 30, a rear side window shade 40, a rear quarter panel window shade 44, and a rear window shade 46. The power shade controller 30 is a computerized device including a computerized processor and is operable to provide electronic commands and/or power to a plurality of electric machines or electric motors operable to control each of the rear side window shade 40, the rear quarter panel window shade 44, and the rear window shade 46. The rear quarter panel window shade 44 includes a power shade electric machine 42 operable to selectively raise and lower the rear quarter panel window shade 44. The power shade controller 30 may monitor inputs from a number of sources, including but not limited to input control surface 12 provided to the driver, input control surface 14 provided to a rear seat passenger, camera/light sensor device 50, and vehicle navigation controller 60. Each of the rear side window 22, the rear quarter panel window 24, the rear window 26, the rear side window shade 40, the rear quarter panel window shade 44, and the rear window shade 46 may include an electronic sensor or sensors providing data related to a status of the respective window or power shade (open/closed or deployed/retracted.) The sensors associated with the windows may be described as window status sensors. The sensors associated with the power shades may be described as power shade status sensors. Vehicle 10 further includes a transmission state sensor operable to generate data related to whether or not the transmission of the vehicle is in reverse.

The rear side window shade 40 is one of two rear side window shades for the vehicle 10. The rear quarter panel window shade 44 is one of two rear quarter panel window shades for the vehicle 10. Other vehicles, such as a sport utility vehicle, a van, or a limousine may include additional windows. The system and method disclosed herein may include a number of windows or window configurations, and the disclosure is not intended to be limited to the examples provided herein. A dashed line box illustrates an aspect of vehicle 10 illustrated in FIG. 2 herein.

The rear side window shade 40 is illustrated as a shade film that may be a paper-thin, flexible, cloth or polymerized sheet that may be spooled upon a spinning axle when the cloth or polymerized sheet is retracted from a surface of the rear side window 22. The rear window shade 46 is illustrated as a mechanical shade including a plurality of slats that may be selectively deployed or rotated to change an amount of light that may pass through the mechanical shade. The rear quarter panel window shade 44 is illustrated as a glass pane including shading which may be deployed or retracted separately from the rear quarter panel window 24, which may be a fixed closed panel. The rear side window shade 40, the rear quarter panel window shade 44 and the rear window shade 46 are provided as examples of deployable window shades that may be controlled by power shade controller 30. Other types or configurations of power shades may be utilized within power shade control system 110, and the disclosure is not intended to be limited to the examples provided herein.

Figure 2:
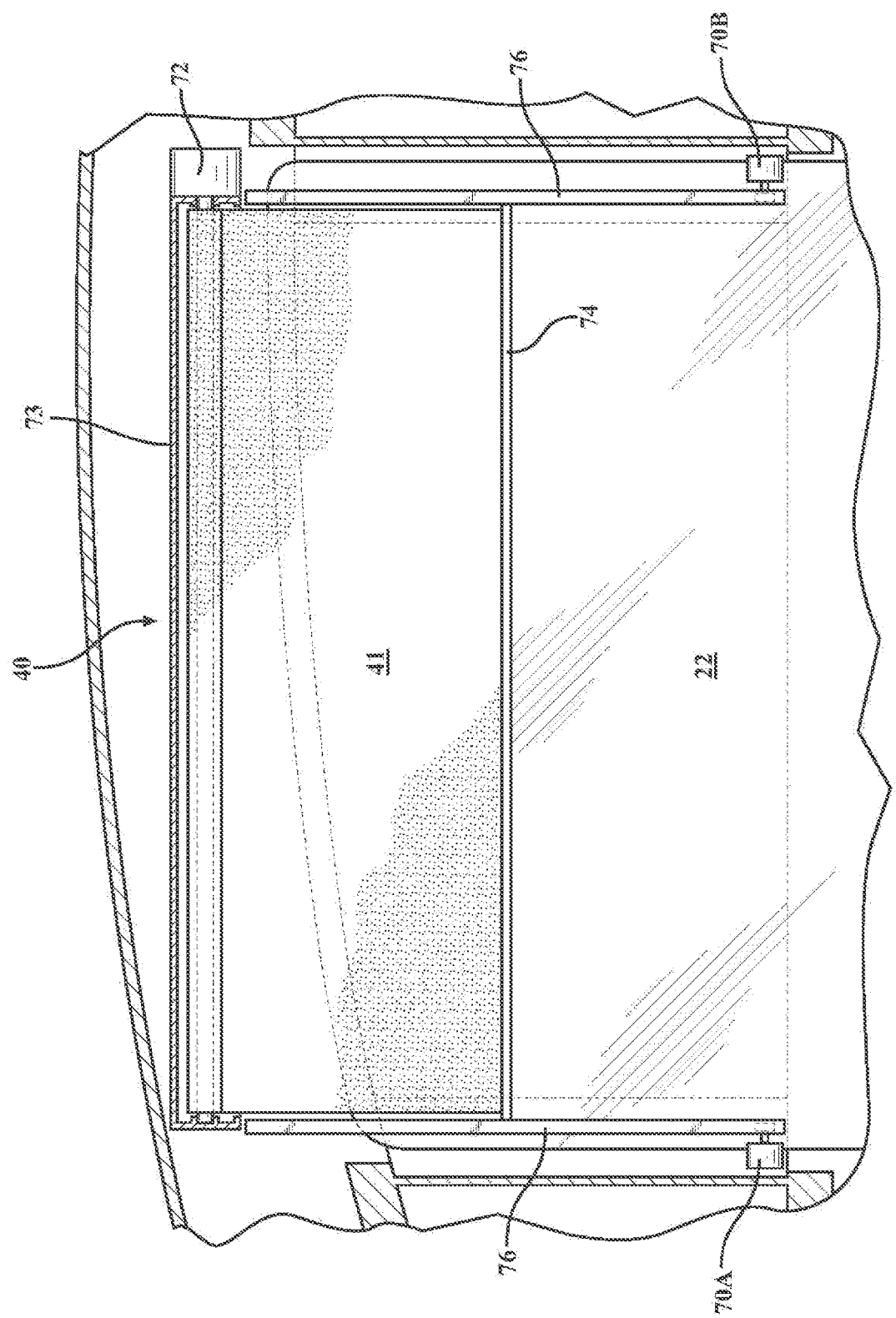
FIG. 2 schematically illustrates in an in-vehicle side sectional view the rear side window and the rear side window shade of FIG. 1, in accordance with the present disclosure.

FIG. 2 schematically illustrates in an in-vehicle side sectional view the rear side window 22 and the rear side window shade 40. The rear side window 22 may be operable to close by moving in an upward direction and open by moving in a downward direction. The rear side window shade 40 may be operable to deploy by moving a shaded film sheet 41 in a downward direction and to retract by spooling the shaded film sheet 41 around a shaft located within spool unit 73. Torque may be provided within the spool unit 73 to retract and spool the shaded film sheet 41 with a torsional spring. In the example of FIG. 2, an electric machine 72 is provided to provide torque within the spool unit 73 to selectively retract and spool the shaded film sheet 41 within the spool unit 73. The shaded film sheet 41 may include a rod 74 attached along a bottom edge. The rod 74 may be attached to one or more side belts 76. The side belts 76 may be located within metallic door structural members along the vertical sides of the rear side window 22. Two side belts 76 are illustrated, each receiving torque from one of electric machine 70A and electric machine 70B. Through torque applied by electric machine 72, electric machine 70A, and electric machine 70B, the shaded film sheet 41 may be selectively deployed and retracted. Additionally, the shaded film sheet 41 may additionally be kept taught and free of wrinkles.

The shaded film sheet 41 is flexible and able to be spooled within the spool unit 73. Such a flexible film sheet may be delicate or easily torn if exposed to wind or precipitation entering through an open window. A control method disclosed herein may include allowing a retracted shaded film sheet 41 to be deployed when the rear side window 22 is already closed. In one embodiment, a user input directed to deploy the shaded film sheet 41 may automatically include a preemptive electronic command to close rear side window 22 before electronically commanding the shaded film sheet 41 to deploy. Similarly, a user input directed to open a closed rear side window 22 may include a preemptive electronic command to automatically retract a deployed shaded film sheet 41 before electronically commanding the rear side window 22 to open.

Figure 3:
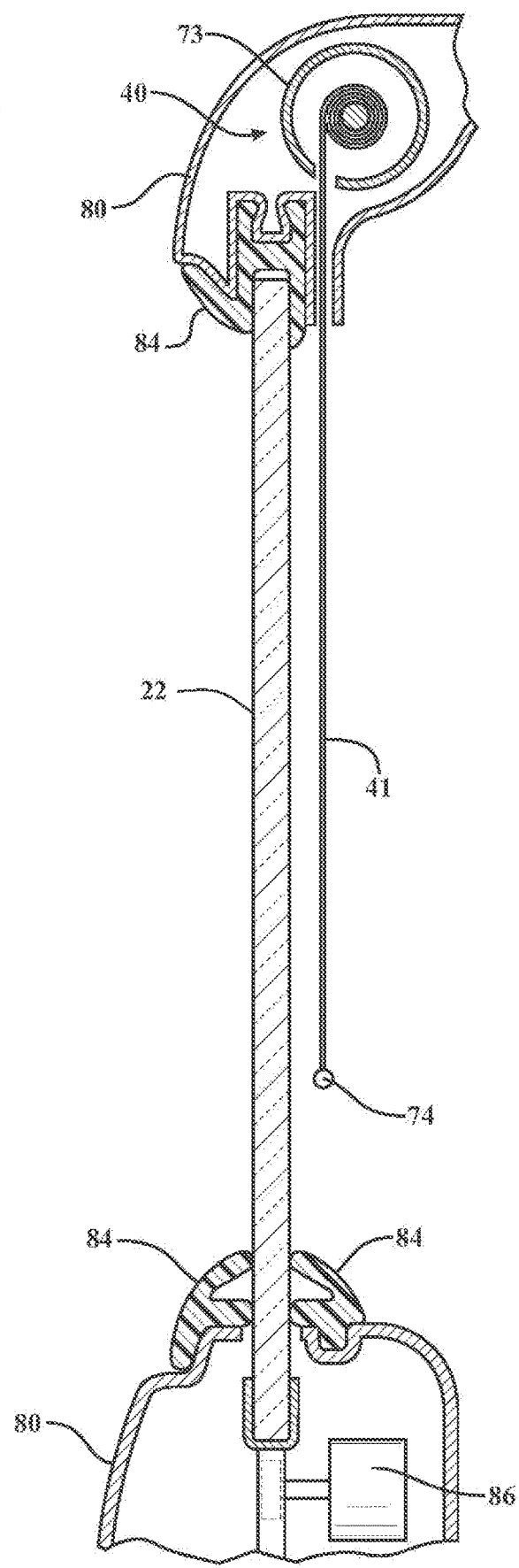
FIG. 3 schematically illustrates in an in-vehicle front sectional view the rear side window and the rear side window shade of FIG. 2, in accordance with the present disclosure.

FIG. 3 schematically illustrates in an in-vehicle front sectional view the rear side window 22 and the rear side window shade 40. The rear side window shade 40 includes the spool unit 73, the shaded film sheet 41, and the rod 74.

The rear side window 22 is illustrated, including power window electric machine 86 operable to raise and lower the rear side window 22. Door structure 80 is illustrated including metallic structural members around the rear side window 22. Weather stripping 84 is illustrated sealing along a top and bottom surface of the rear side window 22. The film sheet 41 is illustrated partially deployed along an inner surface of the rear side window 22.

Figure 4:
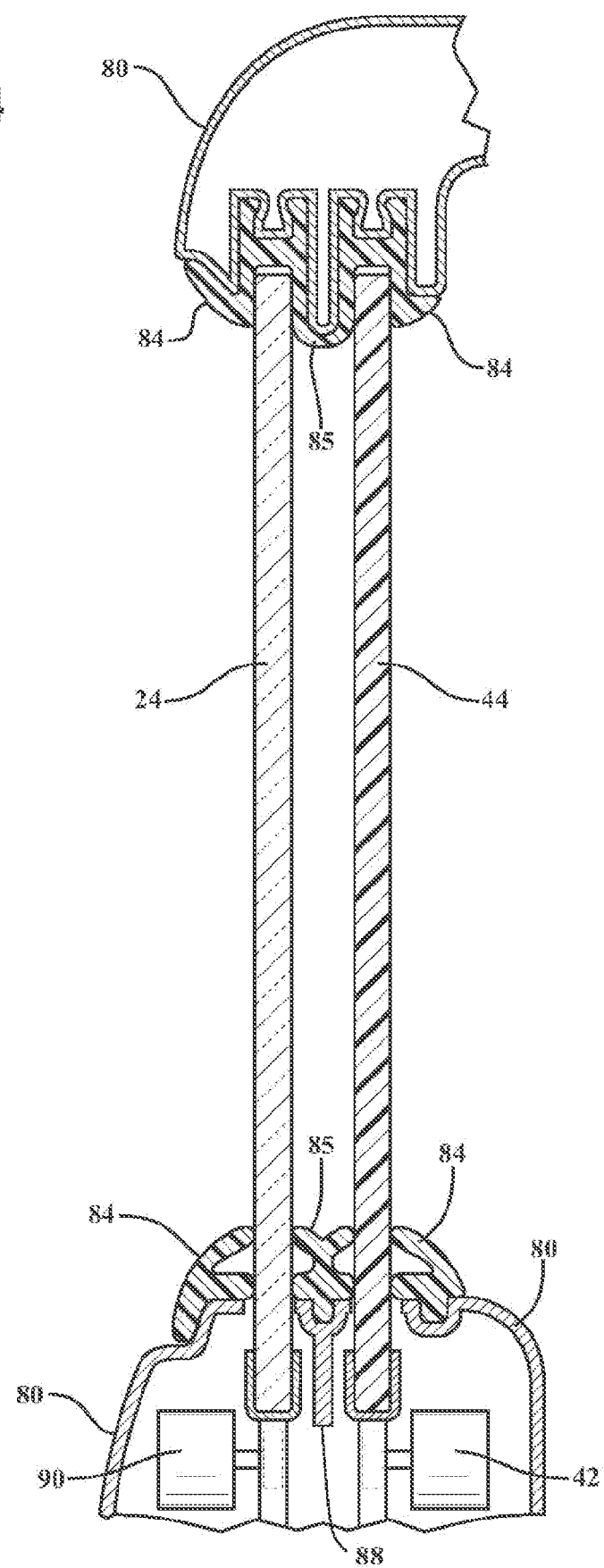
FIG. 4 schematically illustrates in an in-vehicle front sectional view the rear quarter panel window and the rear quarter panel window shade of FIG. 1, in accordance with the present disclosure.

FIG. 4 schematically illustrates in an in-vehicle front sectional view the rear quarter panel window 24 and the rear quarter panel window shade 44. The rear quarter panel window 24 is illustrated including power window electric machine 90 which is operable to selectively raise and lower the rear quarter panel window 24. The rear quarter panel window shade 44 is illustrated including the power shade electric machine 42 which is operable to selectively raise and lower the rear quarter panel window shade 44. The rear quarter panel window 24 may be constructed of glass in the art used to make vehicular glass. The rear quarter panel window shade 44 may be constructed of glass, a polymer, or other transparent or translucent material appropriate for use in a vehicle passenger compartment. The rear quarter panel window shade 44 may include a shading agent distributed throughout the material of the rear quarter panel window shade 44. In another embodiment, the rear quarter panel window shade 44 may include a shaded film upon a surface of an otherwise clear material such as glass.

In one embodiment, a rear quarter panel window 24 may be fixed in a closed state. The disclosed shade types may be used to cover such a fixed closed rear quarter panel window 24. In another embodiment, both the rear quarter panel window 24 and the rear quarter panel window shade 44 may be controlled into lowered positions in order for the window to be open and permit fresh air from outside the vehicle to enter the passenger compartment. In one embodiment, the rear quarter panel window shade 44 may be controlled to be in a raised, closed position if the rear quarter panel window 24 is already in a raised, closed position. In such an embodiment, a control method may include, upon receiving a user input directed to raise the rear quarter panel window shade 44 may automatically include a preemptive electronic command to raise the rear quarter panel window 24 before electronically commanding the rear quarter panel window shade 44. In another embodiment, the rear quarter panel window 24 may to controlled to be in a lowered, open position if the rear quarter panel window shade 44 is already in a lowered, open position. In such an embodiment, a control method may include, upon receiving a user input directed to lower the rear quarter panel window 24 may automatically include a preemptive electronic command to lower the rear quarter panel window shade 44 before electronically commanding the rear quarter panel window 24.

The door structure 80 is illustrated including metallic structural members around the rear quarter panel window 24. The weather stripping 84 is illustrated sealing along a top and bottom surface of the rear quarter panel window 24 and along a top and bottom surface of the rear quarter panel window shade 44. Weather stripping 85 is illustrated sealing against an inner surface of the rear quarter panel window 24 and against an outer surface of the rear quarter panel window shade 44. In one embodiment, a structural element 88 is provided between the rear quarter panel window 24 and the rear quarter panel window shade 44 to provide for mounting the weather stripping 85 along a bottom surface of the rear quarter panel window 24 and the rear quarter panel window shade 44 between the window and the shade. In one embodiment, the weather stripping 84 is operable to seal against weather stripping 85 when either the rear quarter panel window 24 and the rear quarter panel window shade 44 are in the lowered, open positions, such that either the rear quarter panel window 24 and the rear quarter panel window shade 44 may be selectively open and closed and precipitation may be prevented from entering the door panel between the weather stripping seals. In another embodiment, weather stripping may be provided for the outer panel, the rear quarter panel window 24, based upon the control method requiring that the rear quarter panel window shade 44 may be in the raised, closed position when the rear quarter panel window 24 is also in the raised, closed position. In such an embodiment, precipitation is blocked from entering the door panel or the passenger compartment by the weather stripping provided against the rear quarter panel window.

Figure 5:
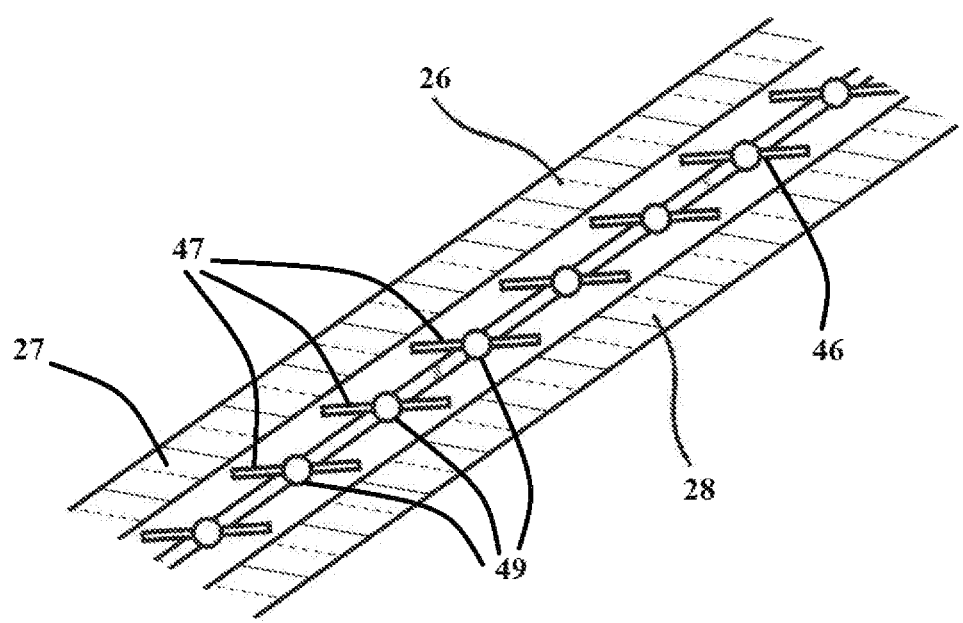
FIG. 5 schematically illustrates an in-vehicle side cross sectional view the rear window and the rear window shade of FIG. 1, in accordance with the present disclosure.

FIG. 5 schematically illustrates an in-vehicle side cross sectional view the rear window 26 and the rear window shade 46. The rear window 26 is illustrated including a first panel of glass 27 and a second panel of glass 28. The rear window shade 46 is illustrated including a plurality of rotatable shutter devices 49 including a plurality of flat panes 47. The rotatable shutter devices may include shaded, translucent, or opaque materials. The rotatable shutter devices 49 may be controlled by one or more electric machines. Based upon rotation of the rotatable shutter devices 49 and the associated resulting angles of the flat panes 47, various degrees of shading may be accomplished by the rear window shade 46.

FIG. 2 illustrates the shade film 41 which may selectably deployed or retracted to control shading of the rear side window 22. FIG. 4 illustrates the rear quarter panel window shade 44 which may be selectably raised or lowered to control shading of the rear quarter panel window 24. FIG. 5 illustrates the rear window shade 46 which includes a plurality of mechanical shades that may be manipulated to control shading of the rear window 26. The shade film 41, the rear quarter panel window shade 44, and the rear window shade 46 are provided as examples of shade devices that may be electronically controlled to control a shade level for a particular window. The different types of shade devices may be utilized in a vehicle window, the control method disclosed herein may be utilized with an electronically controllable window shade, and the disclosure is not intended to be limited to the examples provided herein.

Figure 6:
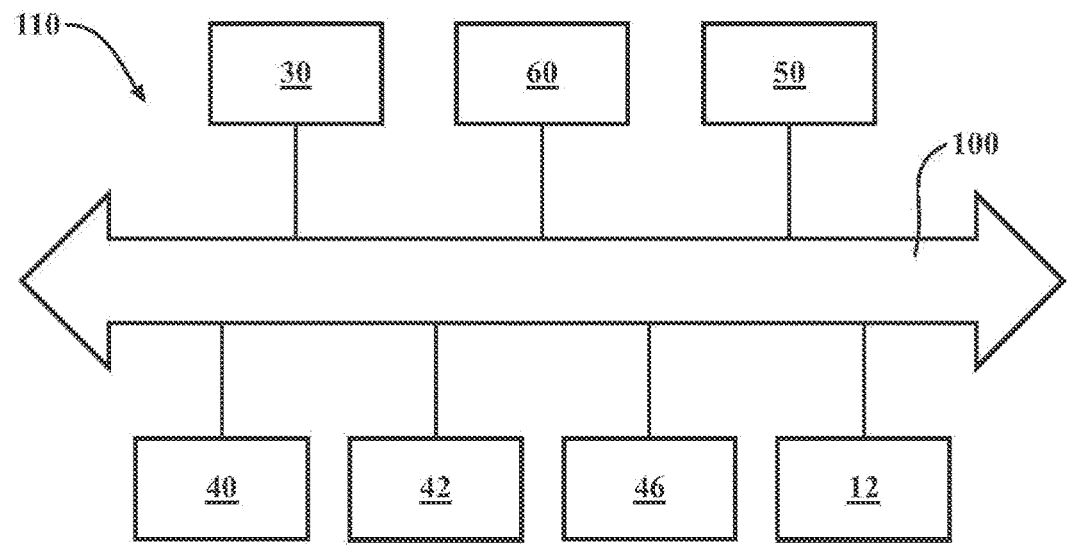
FIG. 6 schematically illustrates an exemplary power shade control system including the power shade controller, the rear side window shade, the panel shade electric machine, and the rear window shade, in accordance with the present disclosure.

FIG. 6 schematically illustrates an exemplary power shade control system 110 including the power shade controller 30, the rear side window shade 40, the power shade electric machine 42, and the rear window shade 46. A bus communication device 100 is illustrated providing for electronic communication between the attached devices. The power shade controller 30, the rear side window shade 40, the power shade electric machine 42, and the rear window shade 46 are each connected to the bus communication device 100. Additionally, the input control surface 12, the camera/light sensor device 50, and vehicle navigation controller 60 are additionally connected to the bus communication device 100. In one embodiment, input control surface 14 of FIG. 1 may additionally be connected to the bus communication device 100. The power shade controller may receive data signals through the bus communication device 100 regarding information such as window position status, shade position status, user inputs, light levels, visual data from the camera/light sensor device 50, and data from the vehicle navigation controller. The power shade controller may generate and communicate electronic commands through the bus communication device 100 to the various devices attached to the bus communication device 100.

Figure 7:
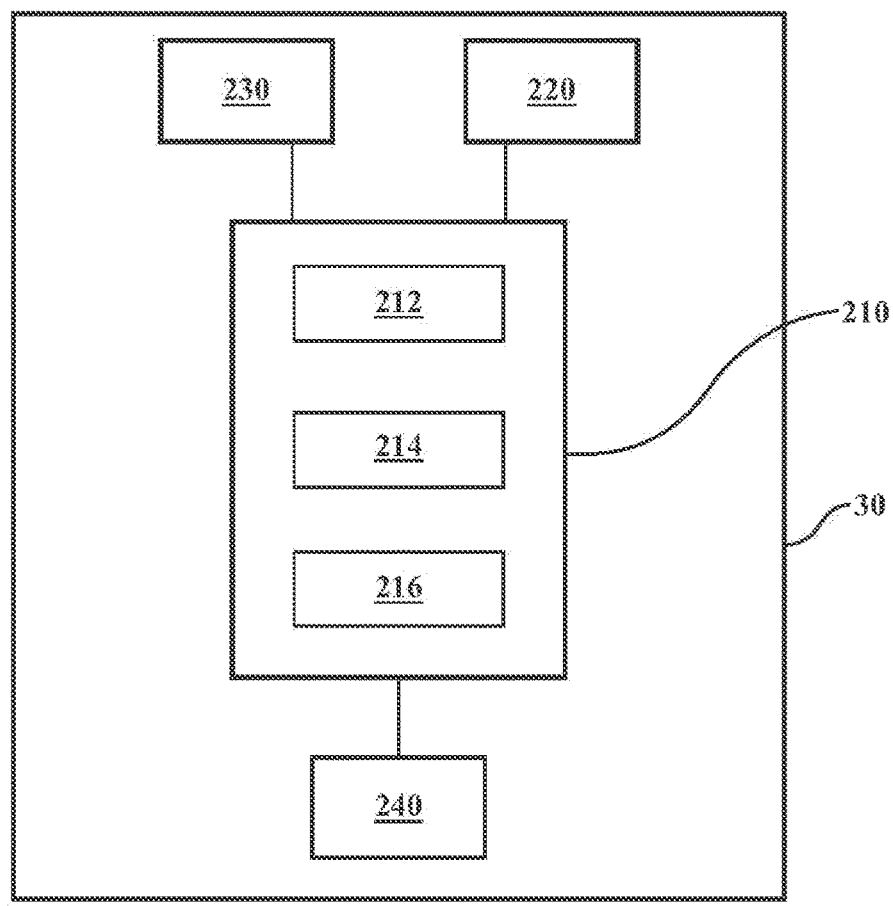
FIG. 7 schematically illustrates an exemplary power shade controller, in accordance with the present disclosure.

Various computerized controllers may be utilized within the disclosed system to operate the disclosed process. Computerized controllers may include a computerized device including a computerized processor including memory capable of storing programmed executable code. A computerized controller may be operated upon a single computerized device or may span several computerized devices. FIG. 7 schematically illustrates the power shade controller 30. Power shade controller 30 includes processing device 210, communications device 220, data input output device 230, and memory storage device 240. It is noted that power shade controller 30 may include other components and some of the components are not present in some embodiments.

The processing device 210 may include memory, e.g., read only memory (ROM) and random-access memory (RAM), storing processor-executable instructions and one or more processors that execute the processor-executable instructions. In embodiments where the processing device 210 includes two or more processors, the processors may operate in a parallel or distributed manner. Processing device 210 may execute the operating system of the power shade controller 30. Processing device 210 may include one or more modules executing programmed code or computerized processes or methods including executable steps. Illustrated modules may include a single physical device or functionality spanning multiple physical devices. In the illustrative embodiment, the processing device 210 also includes power window and shade control module 212, user input control scheme module 214, and automatic reaction scheme module 216, which are described in greater detail below. In one example, automatic reaction scheme module 216 including programming to automatically react when the vehicle transmission is put into a reverse gear by retracting the plurality of shades associated with back glass windows in the vehicle.

The data input output device 230 is a device that is operable to take data gathered from sensors and devices throughout the vehicle and process the data into formats readily usable by processing device 210. Data input output device 230 is further operable to process output from processing device 210 and enable use of that output by other devices or computerized controllers throughout the vehicle.

The communications device 220 may include a communications/data connection with a bus device configured to transfer data to different components of the system and may include one or more wireless transceivers for performing wireless communication.

The memory storage device 240 is a device that stores data generated or received by the power shade controller 30. The memory storage device 240 may include, but is not limited to, a hard disc drive, an optical disc drive, and/or a flash memory drive.

Power window and shade control module 212 includes programmed code operable to gather information about and provide control commands to electric machines and/or other electronic devices controlling power windows and power shades throughout the vehicle. Based upon data or commands generated by the user input control scheme module 214 and the automatic reaction scheme module 216, the power window and shade control module 212 may command selectable movement of the power windows and power shades throughout the vehicle.

User input control scheme module 214 includes programmed code operable to receive and process information related to users providing inputs to input controls within the vehicle, for example, to input control surface 12 or input control surface 14. User input control scheme module 214 may further include programming to implement control schemes describe herein related to generating preemptive related commands. For example, the control schemes may command a window to close prior to deploying a corresponding window shade. In another example, the control schemes may command a shade to be retracted prior to commanding the corresponding window to open.

Automatic reaction scheme module 216 includes programmed code operable to receive and process information from various sources and employ disclosed control schemes related to power shades automatically responding to inputs. For example, the control schemes may automatically retract a rear window shade when the vehicle is put into a reverse transmission setting. In another example, a position of the sun in relation to the vehicle may be monitored, and the power shades may be deployed or retracted based upon whether the corresponding windows face the sun. In another example, an ambient light level may be monitored and compared to a threshold light level, and the power shades may be automatically deployed or retracted based upon the comparison. In another example, a presence of other vehicles in traffic may be monitored through a camera device, light detection and ranging (LIDAR) device, or other similar device, and the shades may automatically be deployed for increased privacy if the traffic density exceeds a threshold traffic density or if one of the other vehicles stays close to the vehicle for more than a threshold time.

Power shade controller 30 is provided as an exemplary computerized device capable of executing programmed code to execute control schemes related to control of power shades and corresponding power windows. Several different embodiments of power shade controller 30, devices attached thereto, and modules operable therein are envisioned, and the disclosure is not intended to be limited to examples provided herein.

Figure 8:
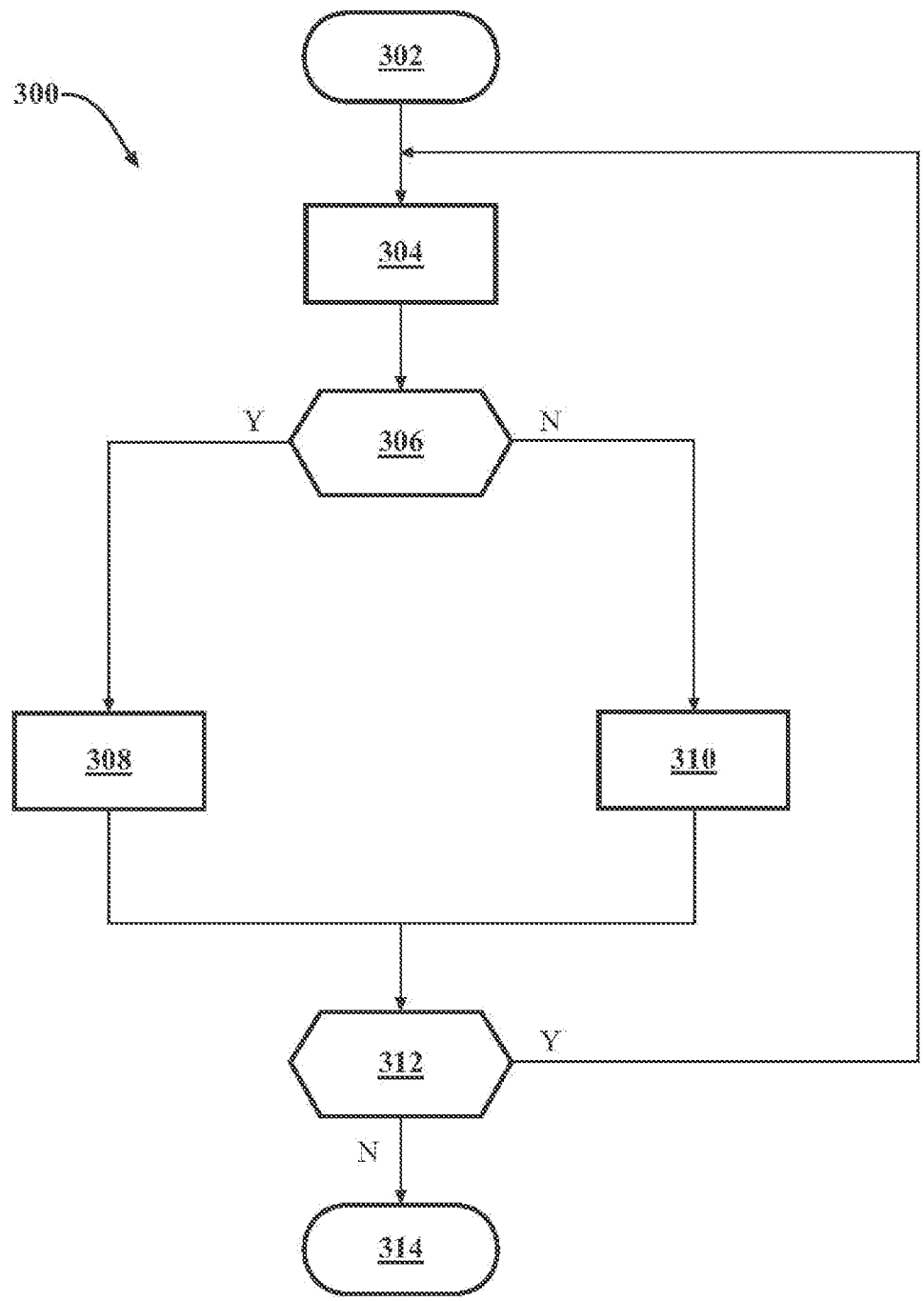
FIG. 8 is a flowchart illustrating a method for vehicular power shade control, in accordance with the present disclosure.

FIG. 8 is a flowchart illustrating a method 300 for vehicular power shade control. The method 300 starts at step 302. At step 304, data from vehicle sensors are monitored related to control of power shades in the vehicle. The data may be related to a current power window open/closed status, a current power shade deployed/retracted status, a current vehicle transmission setting, a planned navigational route, an ambient light level, a sun location in relation to the vehicle, presence of other vehicles in traffic, and other similar data. At step 306, data collected in the step 306 is compared to at least one threshold data value, and a determination is made based upon the comparison. In one embodiment, the comparison includes comparing a current vehicle transmission setting to a reverse transmission setting. In another embodiment, the comparison includes comparing a current vehicle location to a threshold distance from a planned lane change upon a planned navigational route. In another embodiment, the comparison includes comparing a current traffic density in a driving environment neighboring the vehicle to a threshold traffic density. In another embodiment, the comparison includes comparing an ambient light level to a threshold ambient light level. In another embodiment, the comparison includes comparing a sun location in relation to the vehicle to threshold relative angles for a particular window of the vehicle. Several different types of data may be compared to threshold values, and the disclosure is not intended to be limited to the particular examples provided herein. If the comparison of the step 306 indicates that the data collected in step 304 meets or exceeds the threshold value, the method proceeds to step 308, where a power shade is controlled based upon the comparison. If the comparison at step 306 indicates that the data collected in step 304 does not meet or exceed the threshold value, the method proceeds to step 310, where power shade settings are maintained. At step 312, a determination is made whether the method is to be continued. If the method is to be continued, the method returns to step 304 where data continues to be monitored. If the method is not to be continued, the method advances to step 314, where the method ends. Several additional or alternative method steps are envisioned, and the disclosure is not intended to be limited to the examples provided herein.

Figure 9:
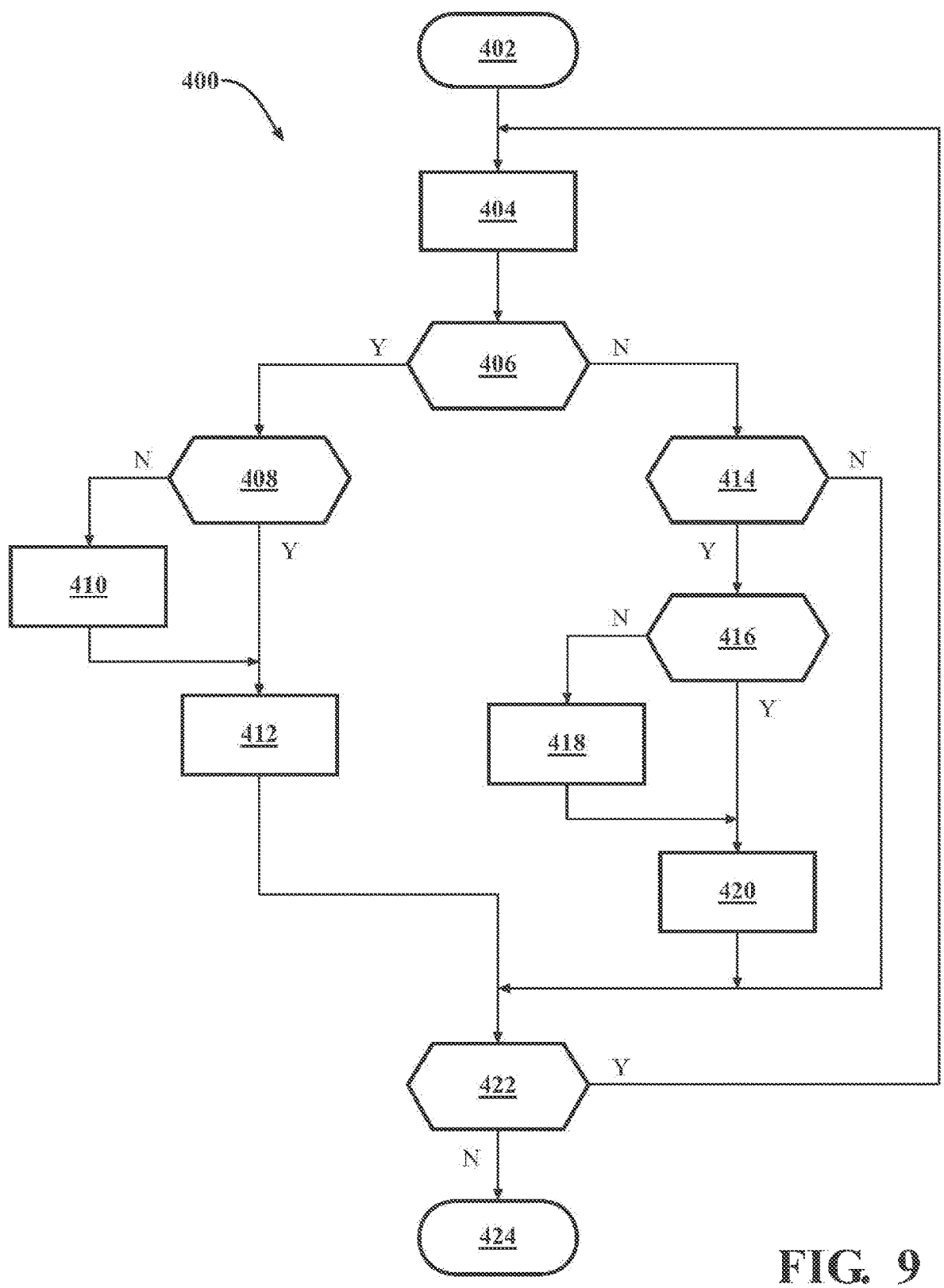
FIG. 9 is a flowchart illustrating an alternative method for vehicular power shade control, in accordance with the present disclosure.

FIG. 9 is a flowchart illustrating a method 400 for vehicular power shade control. The method 400 starts at step 402. At step 404, data related to a current power window open/closed status, a current power shade deployed/retracted status, and a current user input command are monitored. At step 406, a current user input command is compared to a threshold command to open a window. If the current user input command is determined to indicate a command to open a window including a corresponding power shade, the method advances to step 408. If the current user input command is determined to not indicate a command to open a window including a corresponding power shade, the method advances to step 414. At step 408, a determination is made whether the corresponding power shade is in a retracted state. If the corresponding power shade is in a retracted state, the method advances to step 412. If the corresponding power shade is not in a retracted state, the method advances to step 410 where the corresponding power shade is commanded to retract and the method advances to step 412. At step 412, the command to open the window is generated, and the method advances to step 422.

At step 414, a current user input command is compared to a threshold command to deploy a power shade. If the current user input command is determined to indicate a command to deploy the power shade, the method advances to step 416. If the current user input command is determined to not indicate a command to deploy the power shade, the method advances to step 422. At step 416, a determination is made whether a window corresponding to the power shade to be deployed is closed. If the window is closed, the method advances to step 420. If the window is not closed, the method advances to step 418 where the window is commanded to close and the method advances to step 420. At step 420, the command to deploy the power shade is generated, and the method advances to step 422.

At step 422, a determination is made whether the method is to be continued. If the method is to be continued, the method returns to step 404 where data continues to be monitored. If the method is not to be continued, the method advances to step 424, where the method ends. Several additional or alternative method steps are envisioned, and the disclosure is not intended to be limited to the examples provided herein.

While the best modes for carrying out the disclosure have been described in detail, those familiar with the art to which this disclosure relates will recognize various alternative designs and embodiments for practicing the disclosure within the scope of the appended claims.

What is claimed is:

1. A system for vehicular power shade control, comprising:
a power shade operable to selectively deploy and retract in relation to a corresponding window of a vehicle;
a sensor providing data related to the vehicle;
a computerized navigational system operable to provide a planned navigational route; and
a computerized power shade controller operating programming to:
monitor the data from the sensor;
compare the data to a threshold value; and
generate a command to the power shade based upon the comparing;
wherein the data includes a vehicle position;
wherein comparing the data to the threshold value includes determining whether the vehicle position is within a threshold distance of a planned lane change within the planned navigational route; and
wherein generating the command to the power shade includes commanding the power shade to retract based upon the comparing.

2. The system of claim 1, wherein the sensor includes a window status sensor for the corresponding window and is operable to provide the data including a window open/closed status;
wherein comparing the data to the threshold value includes determining whether the window open/closed status indicates a window open status;
wherein the computerized power shade controller further operates programming to command the corresponding window to close; and
wherein generating the command to the power shade includes commanding the power shade to deploy after the corresponding window has closed.

3. The system of claim 1, wherein the computerized power shade controller further operates programming to monitor a user command to open the corresponding window;
wherein the sensor includes a power shade status sensor for the power shade and is operable to provide the data including a power shade deployed/retracted status;
wherein comparing the data to the threshold value includes determining whether the power shade deployed/retracted status indicates a power shade deployed status;
wherein generating the command to the power shade includes, upon monitoring the user command to open the corresponding window, commanding the power shade to retract; and
wherein the computerized power shade controller further operates programming to command the corresponding window to open after the power shade has been retracted.

4. The system of claim 1, wherein the power shade includes a rear window shade;
wherein the sensor includes a transmission state sensor operable to provide the data including a transmission state;
wherein comparing the data to the threshold value includes determining whether the transmission state indicates a reverse transmission setting; and
wherein generating the command to the power shade includes commanding the rear window shade to retract based upon the comparing.

5. The system of claim 4, wherein generating the command to the power shade further includes commanding rear quarter panel window shades and rear side window shades to retract based upon the comparing.

6. The system of claim 1, wherein the sensor includes an ambient light sensor operable to provide the data including an ambient light level;

wherein comparing the data to the threshold value includes determining whether the ambient light level is above a threshold ambient light level; and wherein generating the command to the power shade includes commanding the power shade to deploy based upon the comparing.

7. The system of claim 1, wherein the sensor includes a solar sensor operable to provide a sun position relative to the vehicle;

further comprising the corresponding window;

wherein comparing the data to the threshold value includes determining whether the sun position is within threshold relative angles for the corresponding window indicating that sunlight is shining through the corresponding window; and wherein generating the command to the power shade includes commanding the power shade to deploy based upon the comparing.

8. The system of claim 1, wherein the sensor includes a camera device.

9. The system of claim 8, wherein the camera device is operable to provide a sun position relative to the vehicle;

further comprising the corresponding window;

wherein comparing the data to the threshold value includes determining whether the sun position is within threshold relative angles for the corresponding window indicating that sunlight is shining through the corresponding window; and wherein generating the command to the power shade includes commanding the power shade to deploy based upon the comparing.

10. The system of claim 8, wherein the camera device is operable to provide a traffic density value;

wherein comparing the data to the threshold value includes determining whether the traffic density value exceeds a threshold traffic density; and wherein generating the command to the power shade includes commanding the power shade to deploy based upon the comparing.

11. A vehicle comprising the system of claim 1.

12. A method for vehicular power shade control, comprising:

within a computerized power shade controller of a vehicle, operating programming to:

monitor data related to the vehicle provided by a sensor;

compare the data to a threshold value;

monitor a planned navigational route from a computerized navigational system; and generate a command to a power shade based upon the comparing, wherein the power shade is operable to selectively deploy and retract in relation to a corresponding window of the vehicle;

wherein monitoring the data includes monitoring a vehicle position;

wherein comparing the data to the threshold value includes determining whether the vehicle position is within a threshold distance of a planned lane change within the planned navigational route; and wherein generating the command to the power shade includes commanding the power shade to retract based upon the comparing.

13. The method of claim 12, wherein monitoring the data includes monitoring a window open/closed status for the corresponding window;

wherein comparing the data to the threshold value includes determining whether the window open/closed status indicates a window open status;

further comprising operating programming to command the corresponding window to close; and wherein generating the command to the power shade includes commanding the power shade to deploy after the corresponding window has closed.

14. The method of claim 12, further comprising operating programming to monitor a user command to open the corresponding window;

wherein monitoring the data includes monitoring a power shade deployed/retracted status;

wherein comparing the data to the threshold value includes determining whether the power shade deployed/retracted status indicates a power shade deployed status;

wherein generating the command to the power shade includes, upon monitoring the user command to open the corresponding window, commanding the power shade to retract; and further comprising operating programming to command the corresponding window to open after the power shade has been retracted.

15. The method of claim 12, wherein monitoring the data includes monitoring a transmission state for the vehicle;

wherein comparing the data to the threshold value includes determining whether the transmission state indicates a reverse transmission setting; and wherein generating the command to the power shade includes commanding a rear window shade to retract based upon the comparing.

16. The method of claim 12, wherein monitoring the data includes monitoring an ambient light level;

wherein comparing the data to the threshold value includes determining whether the ambient light level is above a threshold ambient light level; and wherein generating the command to the power shade includes commanding the power shade to deploy based upon the comparing.

17. The method of claim 12, wherein monitoring the data includes monitoring data captured by a solar sensor operable to provide a sun position relative to the vehicle;

wherein comparing the data to the threshold value includes determining whether the sun position is within threshold relative angles for the corresponding window indicating that sunlight is shining through the corresponding window; and wherein generating the command to the power shade includes commanding the power shade to deploy based upon the comparing.

18. The method of claim 12, wherein monitoring the data includes monitoring images captured by a camera device;

wherein monitoring the images captured by the camera device includes monitoring a traffic density value;

wherein comparing the data to the threshold value includes determining whether the traffic density value exceeds a threshold traffic density; and wherein generating the command to the power shade includes commanding the power shade to deploy based upon the comparing.

19. A system for vehicular power shade control, comprising:

a power shade operable to selectively deploy and retract in relation to a corresponding window of a vehicle;

a sensor providing data related to the vehicle; and a computerized power shade controller operating programming to:
monitor the data from the sensor;
compare the data to a threshold value; and
generate a command to the power shade based upon the comparing, wherein:
the sensor includes a camera device;
the camera device is operable to determine a presence of other vehicles close to the vehicle;
comparing the data to a threshold value includes determining whether one of the other vehicles stays close to the vehicle for more than a threshold time; and
generating a command to the power shade based upon the comparing includes commanding the power shade to deploy based upon the comparing.

20. The method of claim 12, wherein:
the sensor includes a camera device;
the camera device is operable to determine a presence of other vehicles close to the vehicle;
comparing the data to a threshold value includes determining whether one of the other vehicles stays close to the vehicle for more than a threshold time; and
generating a command to the power shade based upon the comparing includes commanding the power shade to deploy based upon the comparing.

\* \* \* \* \*